March 22, 1955 W. J. GRUEN 2,704,812

SYNCHRONIZING SYSTEM

Filed May 26, 1949 2 Sheets-Sheet 1

Inventor:
Wolf J. Gruen,
by Merton D. Morse
His Attorney.

March 22, 1955 W. J. GRUEN 2,704,812

SYNCHRONIZING SYSTEM

Filed May 26, 1949 2 Sheets-Sheet 2

Inventor:
Wolf J. Gruen,
by Merton D. Morse
His Attorney

United States Patent Office 2,704,812 Patented Mar. 22, 1955

2,704,812

SYNCHRONIZING SYSTEM

Wolf J. Gruen, Syracuse, N. Y., assignor to General Electric Company, a corporation of New York Application May 26, 1949, Serial No. 95,538

4 Claims. (Cl. 250—36)

Figure 1:
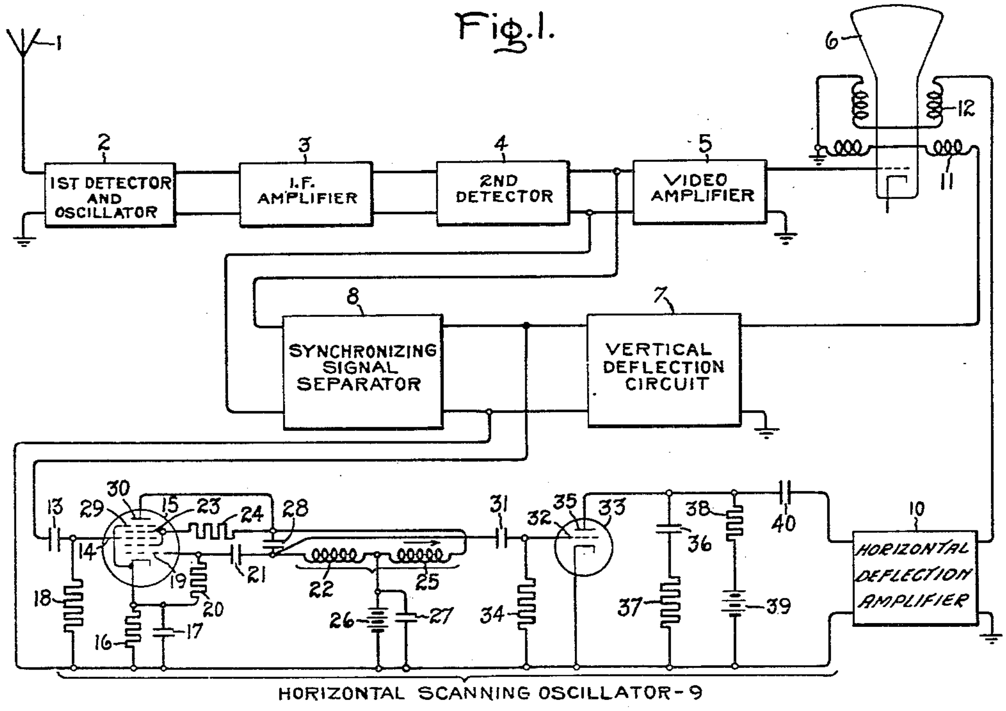

My invention relates to synchronizing systems, and more particularly, to oscillator synchronizing systems which are adapted to operate with a synchronizing signal consisting of periodically recurring pulses which may be interspersed with spurious and undesired noise impulses. While my invention is of general utility, it is particularly adapted for use in the scanning circuits, especially the line frequency scanning circuit, of a television receiver.

In television receivers, it is necessary to synchronize the scanning oscillators of the receiver with synchronizing pulses, which are superimposed on the received video signal, so as to reconstruct the transmitted image in proper phase relationship at the receiver. One way to obtain synchronization would be to apply the synchronizing pulses directly to the scanning oscillator so that each pulse initiates, or triggers, one cycle of oscillation. However, noise impulses occurring between the synchronizing pulses would cause random triggering of the oscillator and periods of asynchronous operation.

To increase noise rejection during synchronization, certain arrangements heretofore proposed have utilized a phase detector circuit to control the scanning oscillator. In these systems locally generated pulses are combined with the incoming synchronizing pulses to derive a phase responsive wave. The derived wave is applied to an integration circuit having a long time constant so that noise impulses present in the synchronizing signal are averaged out over a number of cycles and the substantially continuous control voltage obtained therefrom is used to control the frequency of the scanning oscillator. While such arrangements operate satisfactorily, they necessarily involve a balanced phase detector circuit and associated amplifier in addition to the scanning oscillator itself. It would be desirable to obtain the simplicity of the direct type of synchronization and still achieve discrimination against noise impulses such as is obtained with the phase detector type of synchronization.

I have found that the scanning oscillator of a television receiver may be maintained substantially in phase with received synchronizing pulses in a very simple and effective manner by utilizing as a scanning oscillator an oscillator of the resonant tank or oscillatory circuit type and injecting the synchronizing pulses into the tank circuit of the oscillator. The oscillation of energy within the tank circuit tends to resist changes in both the amplitude and frequency of the oscillations and the tank circuit may be considered as having a time constant which is directly proportional to the Q of the tank circuit, that is, the ratio of stored energy to energy dissipated within the tank circuit each cycle. Also, due to the selectivity of the resonant tank circuit, substantially all frequencies other than the resonant frequency of the tank circuit will be rejected thereby, so that only the fundamental frequency component of the synchronizing pulses, which is approximately the same as the resonant frequency of the tank circuit, will be introduced into the tank circuit to effect synchronism thereof.

Because of the selectivity of the tank circuit and the inertia to changes of amplitude and frequency of the oscillating energy therein, the tank circuit is analogous to a flywheel of substantial mass which tends to rotate at a given speed despite random braking effects thereupon. This flywheel effect of the tank circuit will have an averaging effect on random noise impulses interspersed with the periodic synchronizing pulses, which effect is comparable to the averaging of the integration circuit used with the phase detector type of synchronizing system. Hence, the synchronizing signals may be applied directly to the tank circuit of the scanning oscillator and still obtain a substantial discrimination against spurious and undesired noise impulses which may be present in the synchronizing signal. Accordingly, it is a primary object of my invention to provide a new and improved synchronizing system suitable for use in the scanning circuit of a television receiver.

It is another object of my invention to provide a new and improved synchronized oscillator system suitable for use in the scanning circuit of a television receiver, in which synchronizing pulses are applied directly to the scanning oscillator and substantial noise rejection is obtained.

It is a further object of my invention to provide a new and improved synchronized oscillator system in which synchronizing pulses are injected into the tank circuit of the oscillator, the fundamental frequency energy content of the synchronizing pulses being utilized to synchronize the oscillator.

It is a still further object of my invention to provide a new and improved synchronized oscillator system in which the oscillator is provided with a resonant tank circuit and synchronizing pulses are coupled to the tank circuit to provide synchronizing energy therein, the interval during which synchronizing pulses may be applied to the tank circuit being limited so as to obtain additional discrimination against noise impulses.

Briefly, in accordance with one phase of my invention, I provide a scanning oscillator having a low decrement, resonant tank or oscillatory circuit, this circuit having a resonant frequency substantially equal to the repetition rate of the synchronizing pulses. An electron discharge device is utilized to apply the synchronizing pulses directly to the tank circuit of the oscillator. Due to the selectivity of the tank circuit and the fly-wheel effect thereof, only the fundamental frequency component of the synchronizing pulses is effective to lock the oscillator in phase with the synchronizing pulses, so that substantial noise rejection is obtained although synchronization is maintained. In a particular embodiment, the electron discharge device utilized to apply synchronizing pulses to the tank circuit comprises a section of the oscillator tube itself, the synchronizing pulse applying section being rendered non-conductive over a substantial portion of each cycle of oscillation so as further to reduce the influence of noise impulses present in the synchronizing signal.

Figure 3:
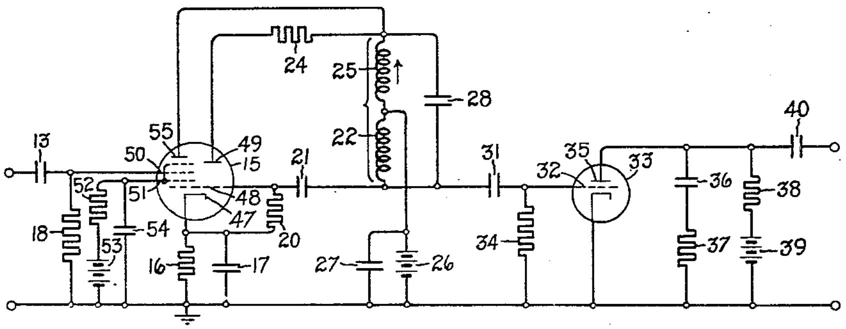
Figure 2A:
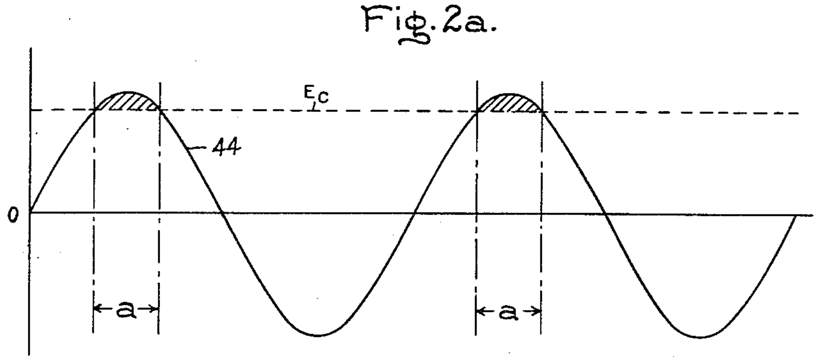
Figure 2B:
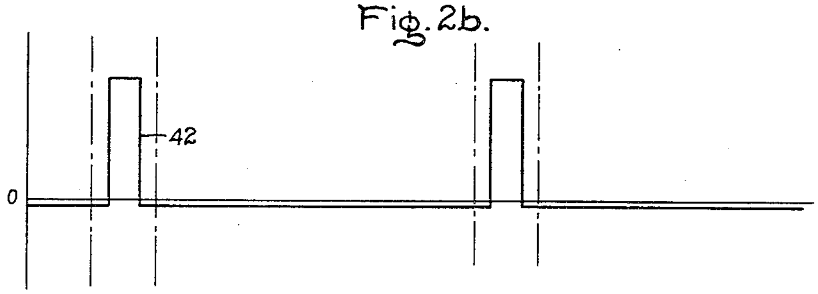
Figure 2C:
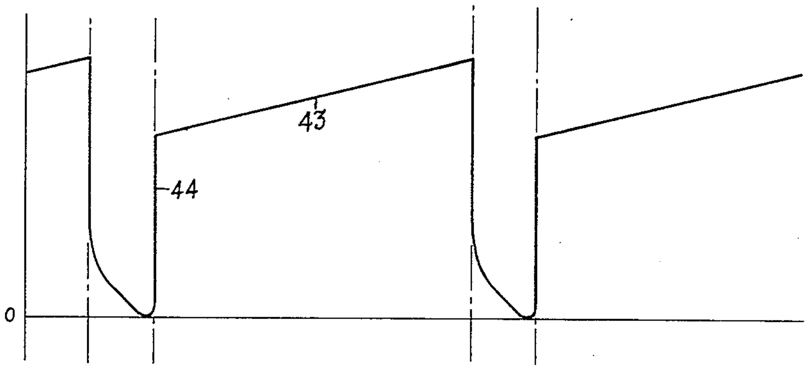

The novel features which are considered to be characteristic of my invention are set forth with particularity in the appended claims. My invention itself, however, both as to its organization and method of operation, together with further objects and advantages thereof, may best be understood by reference to the following description taken in connection with the accompanying drawings, wherein Fig. 1 is a schematic diagram, partly in block diagram form, of a television receiver embodying the principles of my invention; Figs. 2(*a*)–2(*c*) are timing diagrams of wave forms produced in the circuit of Fig. 1; and Fig. 3 is a schematic diagram of an alternative embodiment of the circuit shown in Fig. 1.

Referring now more particularly to the drawing, the system illustrated in Fig. 1 comprises a modulated carrier wave television receiver of the superheterodyne type including an antenna system 1 which is connected to a first detector and oscillator 2, to which are connected in cascade relation in the order named, an intermediate frequency amplifier 3, a second detector 4, a video amplifier 5 and a cathode ray tube viewing device 6. A vertical deflection circuit 7 is connected to the output of the second detector 4 through synchronizing signal separator 8. The output of the synchronizing signal separator is also connected to a synchronizing scanning oscillator circuit 9, to be fully described hereinafter, the output of the scanning oscillator 9 being coupled to a horizontal scanning amplifier 10. The output of the scanning amplifier 10 and deflection circuit 7 are connected to their respective scanning coils 11 and 12 which surround the neck of the cathode ray tube.

The units 1 through 8 and 10 may be of conventional well-known design so that a detailed illustration is unnecessary herein. However, referring briefly to the operation of the above-described system as a whole, television signals intercepted by antenna circuit 1 are applied to oscillator detector 2, wherein they are converted into intermediate frequency signals which are amplified in the amplifier 3 and delivered to the second detector 4. The modulated components of the received signal are detected in second detector 4 and are applied to the video amplifier 5 wherein they are amplified and supplied in the usual manner to the intensity control electrode of the cathode ray tube 6. The detected modulation components are also supplied to synchronizing signal separator 8 wherein the vertical and horizontal synchronizing signals are separated, the vertical synchronizing signals being supplied to the vertical deflection circuit 7. Scanning waves which are generated in the horizontal oscillator circuit 9 are amplified in the horizontal amplifier 10 and applied to the scanning coils 12 of the cathode ray tube device. Likewise, scanning waves from the vertical deflection circuit 7 are applied to the vertical scanning coil 11 so as to produce magnetic scanning fields which deflect the electron beam of the cathode ray tube in two directions perpendicular to each other so as to trace a rectilinear pattern on the screen and thereby to reconstruct the transmitted image.

Referring now more particularly to the portion of Fig. 1 embodying the present invention, synchronizing pulses of positive polarity, which have been separated from the composite television signal in synchronizing signal separator 8, are coupled through capacitor 13 to the third control electrode 14 of a pentagrid type electron discharge device 15. The cathode of device 15 is connected through a parallel combination of a resistor 16 and a capacitor 17 to ground. The electrode 14 of device 15 is also connected to ground through a resistor 18. The first control electrode 19 of device 15 is connected through a resistor 20 to the cathode of device 15, and is also connected through a capacitor 21 and inductance 22 to a source of potential 26. The second and fourth electrodes of device 15 are coupled together within the envelope of the device and form a screen electrode 23, this screen electrode being connected through a resistor 24 and an inductance 25 to the positive terminal of a unidirectional source of potential indicated by the battery 26. The inductances 22 and 25 are negatively mutually coupled together, as is illustrated in the drawing. A capacitor 27 bypasses the unidirectional source of supply for alternating currents. A capacitor 28 is connected from the junction of resistor 24 and inductance 25 to the junction of the capacitor 21 and inductance 22. The fifth electrode 29 of device 15 is connected internally to the cathode of the device. The anode 30 of device 15 is connected to the junction of resistor 24 and inductance 25, anode 30 also being energized from the battery 26 through the inductance 25.

From the junction point of capacitor 21 and capacitor 28, a coupling capacitor 31 connects the signal produced across inductance 22 to the control electrode 32 of an electron discharge device 33. The cathode of device 33 is connected to ground and control electrode 32 thereof is also connected to ground through a resistor 34. The anode 35 of device 33 is connected to ground through a capacitor 36 and resistor 37. Anode 35 is also connected through a resistor 38 to a unidirectional source of potential indicated by the battery 39. A capacitor 40 couples the signals produced in the anode circuit of device 33 to the horizontal amplifier 10 from which scanning waves are supplied to horizontal scanning coils 12 so as to deflect the cathode ray tube electron beam.

Considering now the operation of the above-described synchronized oscillator circuit, it will be apparent that capacitor 28 and inductances 22 and 25 comprise a parallel resonant tank or oscillatory circuit, inductances 22 and 25 being closely coupled together, the junction joint of inductances 22 and 25 being by-passed to ground by capacitor 27. The cathode, control electrode, and screen electrode of device 15 are connected to the tank circuit 22, 25 and 28, so as to sustain oscillations therein. The cathode of device 15 is effectively connected to ground and feedback necessary to sustain oscillations is obtained by connecting the portion of the tank circuit voltage appearing across inductance 22 in regenerative phase to control electrode 19. If the tank circuit Q is relatively large, the energy lost per cycle of oscillation will be considerably smaller than the energy added per cycle by the oscillator section of device 15 so that the amplitude of oscillations within the tank circuit will increase to the point where the control electrode 19 is driven positive with respect to the cathode during the positive peaks of the sinusoidal tank voltage. When the control electrode 19 is driven positive, the capacitor 21 is charged by the flow of control electrode current so that an automatic bias voltage is provided across resistor 20, this bias voltage being dependent upon the amplitude of the sinusoidal voltage across inductance 22. Due to the biasing action of the network 20, 21 and the relatively large sinusoidal voltage which is produced across the tank circuit, the control electrode 19 renders device 15 nonconductive for a substantial portion of the oscillation cycle. The period during which device 15 conducts is just sufficient to add an amount of energy to the tank circuit which balances the losses produced therein during the remainder of the oscillation cycle. Thus the amplitude of the oscillations appearing across the tank circuit are stabilized at a particular value wherein the losses per cycle are exactly balanced by the energy added by device 15 during the conductive portions thereof. The frequency of the oscillations produced in the tank circuit 22, 25 and 28, may be conveniently adjusted by varying the inductance 25 by means of a powdered iron core, or a similar expedient, the frequency being adjusted to be substantially the same as the repetition rate of the synchronizing pulses. The screen electrode 23 acts as the anode of the oscillator section of device 15 and resistor 24, which connects the electrode 23 to the resonant tank circuit 22, 25 and 28, increases the synchronizing range of the oscillator and stabilizes the oscillator against changes in the supply potential 26.

Disregarding for the moment the action of the synchronizing pulses upon the tank circuit and considering the oscillator as a free running sinusoidal wave oscillator, the oscillations produced across inductance 22 are coupled through the network 31, 34 to the control electrode of device 33. The device 33 is an amplifier which is operated with a self-biasing arrangement, the capacitor 31 being charged during positive peaks of the applied sinusoidal wave to provide control electrode bias for the device 33. Due to the large amplitude of the oscillations, the amplifier 33 is driven beyond cutoff during a substantial portion of the oscillation cycle so that the anode current of the amplifier is in the form of relatively narrow pulses. The periodic conduction of the amplifier 33 operates to discharge capacitor 36 which has previously been charged through resistors 37 and 38 from the unidirectional source of potential 39. There is thus produced in the anode circuit of the amplifier 33 a wave form suitable for scanning the cathode ray tube, the pulse component of the scanning wave form being obtained across resistor 37 and the saw-tooth component of the scanning wave form being produced by the charging action of the capacitor 36. The scanning wave form is coupled through capacitor 40 to the horizontal amplifier 10 from which it is supplied to the appropriate scanning coils so as to deflect the cathode ray tube electron beam.

Considering now the operation of the scanning oscillator and the synchronizing action of the synchronizing pulses thereupon, the synchronizing pulses which have been separated from the composite television signal by means of a clipper stage or the like, are supplied to the electrode 14 of device 15. The electrode 14 is connected to ground and is biased negatively with respect to the cathode by virtue of the voltage appearing across the cathode resistor 16 which reduces the no-signal anode current substantially to zero. If the amplitude of oscillations appearing across the tank circuit is of a substantial value, it will be apparent that the control electrode 19 will block the entire device 15 for a substantial portion of the oscillator cycle. Therefore, the electrode 14 will have a controlling effect only during the short time interval that control electrode 19 allows device 15 to conduct, and noise impulses and extraneous voltages which are outside of the controlling interval of electrode 14 will have substantially no effect upon the operation of the oscillator, neglecting the effect of the inter-electrode capacity between electrode 14 and electrode 23, as will be discussed more fully hereinafter. However, during the positive peaks of the sinusoidal control voltage, the electrode 14 has an effect upon the operation of device 15, and positive synchronizing pulses which are applied to electrode 14 and which occur during the control interval thereof, produce pulses of anode current which are applied directly to the tank circuit from the anode 30 of device 15.

In considering the synchronizing action of the pulses of anode current which are supplied to the tank circuit, it should be remembered that energy is oscillating back and forth in the tank circuit, being stored alternately in the capacitive branch and the inductive branch of the tank circuit. If the tank circuit has a low decrement, or a high Q, the ratio of energy stored within the tank circuit to energy dissipated therein during each cycle is large. The energy stored within the tank circuit tends to oscillate at the natural frequency thereof in spite of extraneous disturbances and it is this inertia to change exhibited by the resonant tank circuit which has been called the fly-wheel effect thereof. Due to the selectivity of the resonant tank circuit, substantially all frequencies other than the resonant frequency of the tank circuit are rejected thereby, so that only the fundamental frequency component of the pulses of anode current supplied to the tank circuit are effective to produce synchronism of the tank circuit.

The frequency range over which the fundamental frequency component of the synchronizing pulses will be effective to lock the tank circuit in phase therewith is directly proportional to the amplitude of the fundamental frequency component injected into the tank circuit, inversely proportional to the amplitude of oscillations across the tank circuit, and inversely proportional to the Q of the resonant tank circuit. If the Q of the tank circuit is relatively high, then a substantial fly-wheel action is obtained which provides substantial discrimination against noise impulses which may be present in the synchronizing signal. On the other hand, if the Q of the tank circuit is made excessive, the synchronizing range over which the synchronizing signal is effective to lock in the oscillator is substantially reduced.

In considering further the operation of the synchronized oscillator, reference is now had to Figs. 2(*a*)–2(*c*) wherein there is illustrated the wave forms associated with various portions of the synchronized oscillator circuit. In Fig. 2(*a*) there is illustrated the sinusoidal voltage which appears across the tank circuits 22, 25 and 28, this voltage being indicated by the reference 44. The control electrode cut-off potential of device 15 has been indicated by the reference line $E_c$ and it will be apparent that the device 15 conducts only during the shaded portions of the sinusoidal tank voltage. Because of the selectivity of the tank circuit and the inertia to changes of amplitude and frequency of the oscillating energy therein, the tank circuit is analogous to a fly-wheel of substantial mass which tends to rotate at a given speed despite random braking effects thereupon. During the conducting periods *a* of device 15, the device 15 introduces energy into the tank circuit so as to sustain oscillations at the given speed.

In Fig. 2(*b*) there is illustrated the positive synchronizing pulses which are applied to the electrode 14 of device 15, these synchronizing pulses having been indicated as occurring during the conducting intervals of the device 15. As the synchronizing pulses are of positive polarity, they operate periodically to introduce additional energy into the tank circuit by virtue of the increase in anode current produced thereby. The synchronizing pulses have to occur during the conducting periods of device 15 in order to effect synchronization thereof. It is evident from an inspection of Fig. 2(*a*) that device 15 has an angle of conduction indicated by the reference character *a*, which is a small portion of the total oscillation cycle. Therefore, synchronizing pulses of double repetition rate, such as are provided at the end of each framing period, and extraneous noise impulses which occur outside the intervals *a* have substantially no effect upon the operation of the oscillator section of device 15. Also, during the conduction intervals *a* the tank circuit of the oscillator possesses sufficient fly-wheel action so as to overcome low energy disturbances which may fall within the conduction interval.

If we consider the cut-off potential $E_c$ as also being representative of the cut-off potential of the amplifier tube 33, it will be apparent that the anode current of amplifier 33 will also flow only during the conductive period *a*. In Fig. 2(*c*) there is illustrated the scanning voltage wave form which is produced in the anode circuit of the amplifier 33 due to periodic conduction during the intervals *a* thereof. The composite wave form comprises a saw-tooth wave portion 43 due to the charging action of capacitor 36 and a pulse wave portion 44 which is due to the voltage produced across resistor 37. The composite wave form shown in Fig. 2(*c*) is supplied to the horizontal scanning amplifier 10 as has been described heretofore.

In the synchronizing circuit illustrated in Fig. 1, it will be apparent that noise voltages which are present at control electrode 14 during the nonconducting interval of device 15, may be coupled to the resonant tank circuit through the interelectrode capacity between electrodes 14 and 23. In order substantially to reduce this interelectrode capacity coupling, I provide in the alternative embodiment shown in Fig. 3, a synchronized oscillator circuit in which there is substantially no interference from noise impulses and random voltages during the non-conducting portions of the oscillation cycle. In Fig. 3 identical elements of Fig. 1 have been indicated by the same reference numerals and no discussion need be made thereof in connection with Fig. 3. Device 15 comprises a combined triode-hexode type electron discharge device having a cathode 47 which is common to both sections of the device and having a control electrode 48 which is common to both sections of the device. The anode 49, control electrode 48 and cathode 47 of device 15 operate as a triode oscillator in a manner similar to the oscillator section of device 15 shown in Fig. 1. However, in the hexode section, the electrode 50, to which synchronizing pulses are applied, is effectively screened by the combined electrodes 51, which are connected together internally of the tube and which are connected through a resistor 52 to a unidirectional source of potential 53, the electrode 51 being by-passed to ground by means of a capacitor 54. Due to the fact that the oscillator anode is isolated from the signal input circuit 13, and that screen electrode 51 is by-passed to ground, substantially no interference due to interelectrode capacitive coupling to the tank circuit is experienced.

In operation, the circuit of Fig. 3 functions in a manner substantially similar to the circuit illustrated and described in Fig. 1, so that a detailed description thereof is considered unnecessary herein. The triode section of device 15 operates as a grounded cathode Hartley oscillator and the hexode section of device 15 operates to inject the fundamental frequency component of the synchronizing signal into the tank circuit 22, 25 and 28, so as to effect synchronism thereof.

While my invention has been described by reference to particular embodiments thereof, it will be understood that numerous modifications may be made by those skilled in the art without departure from my invention. I, therefore, aim in the appended claims, to cover all such equivalent variations as come within the true spirit and scope of my invention.

What I claim as new and desire to secure by Letters Patent of the United States is:

1. In a television receiver, the combination of a source of synchronizing pulses, a resonant circuit, an electron discharge device having at least a cathode, first control electrode, a second control electrode, a screen electrode and an anode, means interconnecting said resonant circuit with said cathode, said first control electrode and said screen electrode for producing oscillations in said resonant circuit of substantially the same frequency as said synchronizing pulses, means for supplying said synchronizing pulses to said second control electrode, means including the anode-to-cathode path of said device for injecting into said resonant circuit frequency corrective energy proportional to the fundamental frequency energy content of said synchronizing pulses, thereby to maintain said produced oscillations in substantially fixed phase relation with respect to said synchronizing pulses, and means utilizing said produced oscillations to effect a scanning operation in the receiver.

2. In a television receiver, the combination of a source of synchronizing pulses, a resonant circuit, an electron discharge device having at least a cathode, a first control electrode, a second control electrode, a screen electrode and an anode, means interconnecting said resonant circuit with said cathode, said first control electrode and said screen electrode for producing oscillations in said resonant circuit of substantially the same frequency as said synchronizing pulses, means including a resistor connected between said screen electrode and said resonant circuit for increasing the operating range of said oscillation producing means, means for supplying said synchronizing pulses to said second control electrode, means including the anode-to-cathode path of said device for injecting into said resonant circuit frequency corrective energy proportional to the fundamental frequency energy content of said synchronizing pulses, thereby to maintain said produced oscillations in substantially fixed phase relation with respect to said synchronizing pulses, and means utilizing said produced oscillations to effect a scanning operation in the receiver.

3. In a television receiver, the combination of a source of synchronizing pulses, a resonant circuit tuned to the frequency of said pulses, an electron discharge device having a first section including a cathode, a first control electrode and a first anode and having a second section including said cathode, said first control electrode, a second control electrode, a screen electrode, and a second anode, means interconnecting said cathode, said first electrode, and said first anode for producing oscillations in said resonant circuit of substantially the same frequency as said synchronizing pulses, said first control electrode being biased with respect to said cathode to render said first and said second sections of said device non-conductive over a substantial portion of the oscillation cycle, means supplying said synchronizing pulses between said second control electrode and said cathode of said second section, means including the cathode-to-second-anode discharge path of said second section for injecting frequency-corrective energy proportional to the fundamental frequency energy content of said synchronizing pulses into said resonant circuit only during the conducting periods of said discharge device, thereby to maintain said produced oscillations in substantially first phase relation with respect to said synchronizing pulses, and means utilizing said produced oscillations to effect a scanning operation in the receiver.

4. In a television receiver, the combination of a source of positive synchronizing pulses having a predetermined fundamental frequency, a multi-grid electron discharge device having a cathode and a plate, a frequency determining resonant circuit tuned to the fundamental frequency of the synchronizing pulses, means for coupling said resonant circuit to said cathode and the grids adjacent thereto so as to sustain oscillations in said resonant circuit, said coupling means including biasing means whereby free running Class-C operation is effected, means for coupling the positive synchronizing pulses from said source to a grid that is remote to said cathode, means for coupling said plate to said resonant circuit.

References Cited in the file of this patent

UNITED STATES PATENTS

| | | |
|---|---|---|
| 2,096,877 | Manifold et al. | Oct. 26, 1937 |
| 2,288,554 | Smith, Jr. | June 30, 1942 |
| 2,292,148 | Moe | Aug. 4, 1942 |
| 2,408,684 | Roberts | Oct. 1, 1946 |
| 2,419,569 | Labin et al. | Apr. 29, 1947 |
| 2,431,577 | Moore | Nov. 25, 1947 |
| 2,445,933 | Beste | July 27, 1948 |
| 2,628,313 | Schlesinger | Feb. 10, 1953 |

FOREIGN PATENTS

| | | |
|---|---|---|
| 585,613 | Great Britain | Feb. 13, 1947 |